(12) United States Patent
Acharya et al.

(10) Patent No.: US 7,675,899 B2
(45) Date of Patent: Mar. 9, 2010

(54) PACKET-AWARE TRANSPORT ARCHITECTURE FOR ENHANCED DATA VOLUME

(75) Inventors: Swarup Acharya, New Providence, NJ (US); Bhawna Gupta, Edison, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1134 days.

(21) Appl. No.: 11/290,873

(22) Filed: Nov. 30, 2005

(65) Prior Publication Data

US 2007/0121658 A1    May 31, 2007

(51) Int. Cl.
    H04L 12/28    (2006.01)
(52) U.S. Cl. .................. 370/351; 370/258; 370/222; 370/223
(58) Field of Classification Search .......... 370/258, 370/402, 404–406, 424, 452, 460, 389, 399, 370/397, 351–352, 216–235, 395, 403, 408, 370/252, 907, 906, 905, 909, 535, 537, 465, 370/242; 359/114, 118, 119, 124; 340/825.01, 340/827; 379/221; 709/235, 251
See application file for complete search history.

(56) References Cited

U.S. PATENT DOCUMENTS

| | | | | |
|---|---|---|---|---|
| 6,094,417 | A * | 7/2000 | Hansen et al. | 370/222 |
| 6,819,662 | B1 * | 11/2004 | Grover et al. | 370/351 |
| 7,009,991 | B2 * | 3/2006 | Shachar et al. | 370/436 |
| 7,096,275 | B1 * | 8/2006 | Doshi et al. | 709/238 |
| 7,269,346 | B1 * | 9/2007 | Iyer et al. | 398/3 |
| 7,596,313 | B1 * | 9/2009 | Iyer et al. | 398/5 |
| 2006/0098660 | A1 * | 5/2006 | Pal et al. | 370/395.51 |

OTHER PUBLICATIONS

C.-G. Liu et al., "Improving RPR Fairness Convergence," IEEE Asia-Pacific Conference on Circuits and Systems, pp. 469-472, Dec. 2004.

A.I. Elwalid et al., "Effective Bandwidth of General Markovian Traffic Sources and Admission Control of High Speed Networks" IEEE/ACM Transactions on Networking, vol. 1, No. 3, pp. 329-343, Jun. 1993.

H. Saito et al., "An Analysis of Statistical Multiplexing in an ATM Transport Network," IEEE Journal on Selected Areas in Communications, vol. 9, No. 3, pp. 359-367, Apr. 1991.

(Continued)

*Primary Examiner*—Ayaz R Sheikh
*Assistant Examiner*—Chuong T Ho
(74) *Attorney, Agent, or Firm*—Ryan, Mason & Lewis, LLP

(57) ABSTRACT

Packet-aware transport architecture and techniques for implementing same that enhance data volume by scaling effectively to rapid data growth are disclosed. For example, a technique for determining a route for a demand in a circuit-switched network comprises the following steps/operations. The demand to be routed in the circuit-switched network is obtained. The circuit-switched networks implements a packet ring (PR) model such that one or more demands are routable on one or more virtual data rings in the circuit-switched network. An Ethernet-Over-SONET (EOS) communication channel in the circuit-switched network suitable for accommodating the demand is specified. The EOS communication channel or one of the one or more virtual data rings is then identified as the new route for the demand.

23 Claims, 8 Drawing Sheets

OTHER PUBLICATIONS

M. Sridharan et al., "Operating Mesh-Survivable WDM Transport Networks," SPI Int. Terabit Optical Networking, 11 pages, Nov. 2000.

K. Bala et al., "Towards Hitless Reconfiguration in WDM Optical Networks for ATM Transport," IEEE GLOBECOM Proceedings, pp. 316-320, 1996.

S. Acharya et al., "MPLS Network Tuning: Enabling Hitless Network Engineering," Proceedings of IEEE Intl. Conference on Communications (ICC), 5 pages, May 2003.

A. Gençata et al., "Virtual-Topology Adaptation for WDM Mesh Networks Under Dynamic Traffic," IEEE/ACM Transactions on Networking, vol. 11, No. 2, pp. 236-247, Apr. 2003.

Y.-S. Myung et al., "Optimal Load Balancing on SONET Bidirectional Rings," Operations Research, vol. 45, No. 1, pp. 148-152, Jan.-Feb. 1997.

S. Cosares et al., "An Optimization Problem Related to Balancing Loads on SONET Rings," Science Publishers, Telecommunications Systems, vol. 3, pp. 165-181, 1994.

I. Widjaja et al., "Online Traffic Engineering with Design-Based Routing," Proceedings of ITC Specialist Workshop, Wurzburg, 10 pages, Jul. 2002.

\* cited by examiner (a) PR NETWORK (b) EoS NETWORK

FIG. 5
(a) VDR
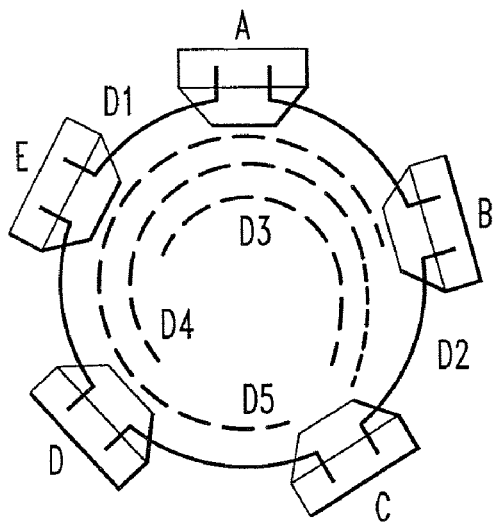
(b) EOS DESIGN 1
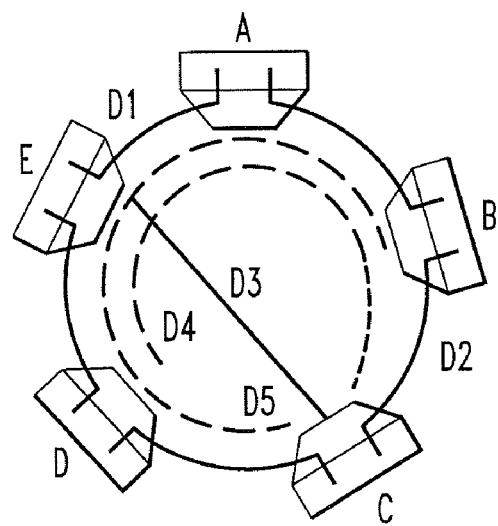
(c) EOS DESIGN 2
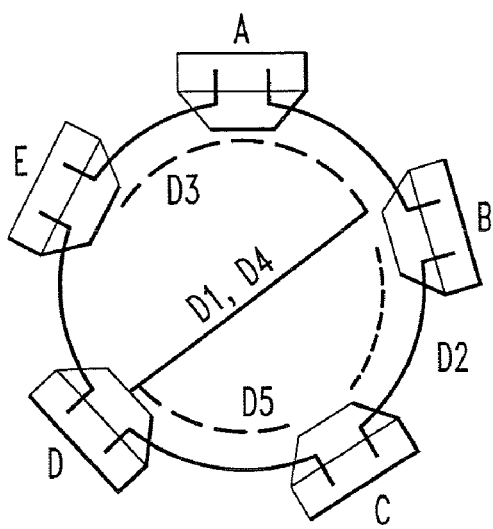
(d) EOS DESIGN 3
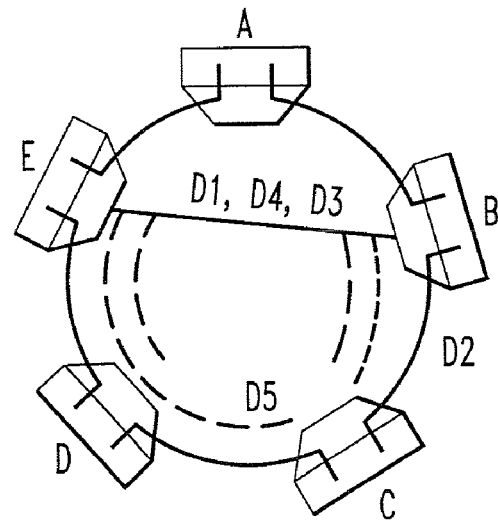

FIG. 6

SFRA ALGORITHM

- *Input:*
  1) The rejected demand $d$ between src-dest pair $(o,t)$ and its $CIR_d$, $PIR_d$ requirement.
  2) Bottleneck links $BL$

- *Output:*
  1) New route for the rejected demand or failure

- *Algorithm:*
  1) Create a list of demands that use any links in set $BL$
  2) Sort these demands in sets $P_{s,d}$ based on the src-dest pair s,d of the demands and add the rejected demand in the set $P_{o,t}$
  3) Call function *designEOS()* for each set to compute the potential EOS with its size and efficiency
  4) Select the EOS which has the most efficiency
  5) If could not find any EOS, go to step 9.
  6) If scarcity of optical resources or switching capacity at EOS end-nodes, skip it and goto Step 4.
  7) Else allocate optical resources to this EOS between s,d and reroute the demands in the set $P_{s,d}$
  8) If $BL$ still do not have enough spare capacity for $d$, go to step 4
  9) If $BL$ still not free, return failure
  10) Else return success

- *designEOS:*
  1) Compute $MB = (\sum CIR_i + OF/100 * \sum EIR_i)$
  2) Compute $LS = ceil(max(MB, maxPIR_i)/51) * 51$
  3) Compute $BEM = (MB - LS) - k * LS/PIR_d$;

FIG. 7

SFEA ALGORITHM

- *Input:*
  1) The rejected demand $d$ between src-dest pair $(o,t)$ and its $CIR_d$, $PIR_d$ requirement.

- *Output:*
  1) New route for the rejected demand or failure

- *Algorithm:*
  1) If there already exists EOS between nodes $(o,t)$, compute the increase in EOS required to support $d$, similar to *SFRA*
  2) If no such EOS, required size for a new EOS is $ceil(PIR/51)$
  3) If enough available optical and switching resources, allocate resources to EOS and return EOS as feasible route for $d$
  4) Else return failure

PACKET-AWARE TRANSPORT ARCHITECTURE FOR ENHANCED DATA VOLUME

FIELD OF THE INVENTION

The present invention relates generally to data communication networks and, more particularly, to techniques for providing a packet-aware transport architecture that enhances data volume.

BACKGROUND OF THE INVENTION

The rapid growth in Internet access and Voice-Over-Internet Protocol (VOIP) services is putting increased pressure on service providers to find cost-effective means of carrying data traffic over their synchronous optical network (SONET) transport networks, originally designed for legacy circuit-switched, time division multiplexed (TDM) traffic. The same is true for service providers with synchronous digital hierarchy (SDH) networks, the predominant standard outside the U.S. It is to be appreciated that while we specifically use the term "SONET" herein, we intend for this to refer to both SONET and SDH networks.

To address the problem of carrying data traffic over SONETs, two architectures have been proposed. They are the Ethernet-Over-SONET (EOS) architecture and the Packet Ring (PR) architecture.

A SONET deployment typically consists of Add-Drop Multiplexer (ADM) nodes interconnected as a ring. Such a deployment follows the STS (synchronous transport signal) TDM hierarchy with ring capacities of STS-{12, 48, 192} (622 megabits per second, 2.5 gigabits per second, and 10 gigabits per second of bandwidth capacity, respectively), though next-generation SONET standards such as Virtual Concatenation (VCAT) and the Link Capacity Adjustment Scheme (LCAS) relax this strict hierarchy and allow capacities at the granularity of STS-1.

Mapping the data traffic from an Ethernet port directly into a SONET pipe leads to inefficient use of bandwidth since data traffic is bursty and the SONET pipe is provisioned at the peak rate. Consequently, in order to make effective use of the bandwidth, SONET ADMs are increasingly including Ethernet line cards (ELC) to perform statistical multiplexing of data traffic before inserting it into the ring. Such transport networks that are adapted to carry data traffic are referred to as packet-aware transports.

The two models, EOS and PR, differ in how they allocate transport bandwidth for the data traffic. FIGS. 1(a) and 1(b) show the respective schematics. The nodes S1-S5 (FIGS. 1(a) and 1(b)) are SONET Add-Drop Multiplexers and A1-A5 (FIG. 1(a)) and P1-P5 (FIG. 1(b)) are the packet processing nodes required in the Packet Ring and EOS models, respectively. Note that this packet processing can be done at the ELC cards mentioned above or in a separate node connected back-to-back to the SONET ADMs.

In the PR approach, a portion of the SONET ring is carved out and dedicated as a "virtual data ring" (VDR) for data traffic (e.g., STS-12 bandwidth from an STS-48 SONET ring). The data packets are processed and switched at every intermediate node along the path to the destination, as shown in FIG. 1(a) for demand D1 that gets switched at nodes A2, A3 and A4. It is to be understood that an intermediate node is a node in the subject path other than the source node and the destination node. The IEEE RPR standard ("IEEE 802.17 RPR," IEEE Standard, 2004) follows this PR approach.

On the other hand, in the EOS approach, the data traffic originating at a node is aggregated on the ELC and mapped directly onto a SONET STS pipe of adequate granularity. This pipe is "expressed" through the SONET layer to the destination node with no packet processing at the intermediate nodes. Note that demand D1 does not get switched at intermediate node P3 in FIG. 1(b). This approach leads to the creation of a SONET pipe for each node pair that has a demand between them.

While the EOS approach and the PR approach each provide advantages, they each do not scale effectively to rapid data traffic growth. Thus, a packet-aware transport architecture that enhances data volume by scaling effectively to rapid data growth is desired.

SUMMARY OF THE INVENTION

The present invention provides a packet-aware transport architecture and techniques for implementing same that enhance data volume by scaling effectively to rapid data growth.

For example, in one aspect of the invention, a technique for determining a route for a demand in a circuit-switched network comprises the following steps/operations. The demand to be routed in the circuit-switched network is obtained. The circuit-switched network implements a packet ring (PR) model such that one or more demands are routable on one or more virtual data rings in the circuit-switched network. An Ethernet-Over-SONET (EOS) communication channel in the circuit-switched network suitable for accommodating the demand is specified. The EOS communication channel or one of the one or more virtual data rings is then identified as the new route for the demand.

The demand for which the route is to be determined may be a demand previously rejected by the circuit-switched network, a demand already routed in the circuit-switched network, or a demand anticipated to be routed in the circuit-switched network.

The step/operation of obtaining the demand may further comprise obtaining at least one of a committed information rate and a peak information rate associated with the demand.

The step/operation of specifying the EOS communication channel may further comprise computing a bandwidth efficiency metric. Computation of the bandwidth efficiency metric may be based on a size of the EOS communication channel being considered and a measure of the statistically multiplexed bandwidth of demands that the EOS communication channel being considered will accommodate.

Further, the technique may comprise identifying one or more bottleneck nodes in the circuit-switched network. One or more of the identified bottleneck nodes may be bypassed. This may be done by rerouting one or more existing demands in the circuit-switched network.

Advantageously, illustrative principles of the invention provide service providers with efficient techniques for carrying packet data over their legacy SONET/SDH networks, designed for circuit-switched voice traffic. To this end, illustrative principles of the invention provide a hybrid architecture that makes selective use of EOS communication channels (referred to herein as "pipes") in conjunction with a PR capability. We formulate and propose a solution to the setup failure re-arrangement problem that dynamically creates EOS pipes to supplement the existing PR if the system fails to satisfy incoming demands. We show through extensive simulations that by doing so, this architecture not only enables higher data traffic loads but achieves it with lower data switching capacity.

These and other objects, features and advantages of the present invention will become apparent from the following detailed description of illustrative embodiments thereof, which is to be read in connection with the accompanying drawings.

BRIEF DESCRIPTION OF THE DRAWINGS

FIGS. 5(a) through 5(d) illustrate hybrid ring solutions, according to embodiments of the present invention;
FIG. 6 illustrates a set-up failure re-arrangement algorithm, according to an embodiment of the present invention;
FIG. 7 illustrates a set-up failure re-arrangement algorithm, according to another embodiment of the present invention.

DETAILED DESCRIPTION OF THE INVENTION

Figure 1:
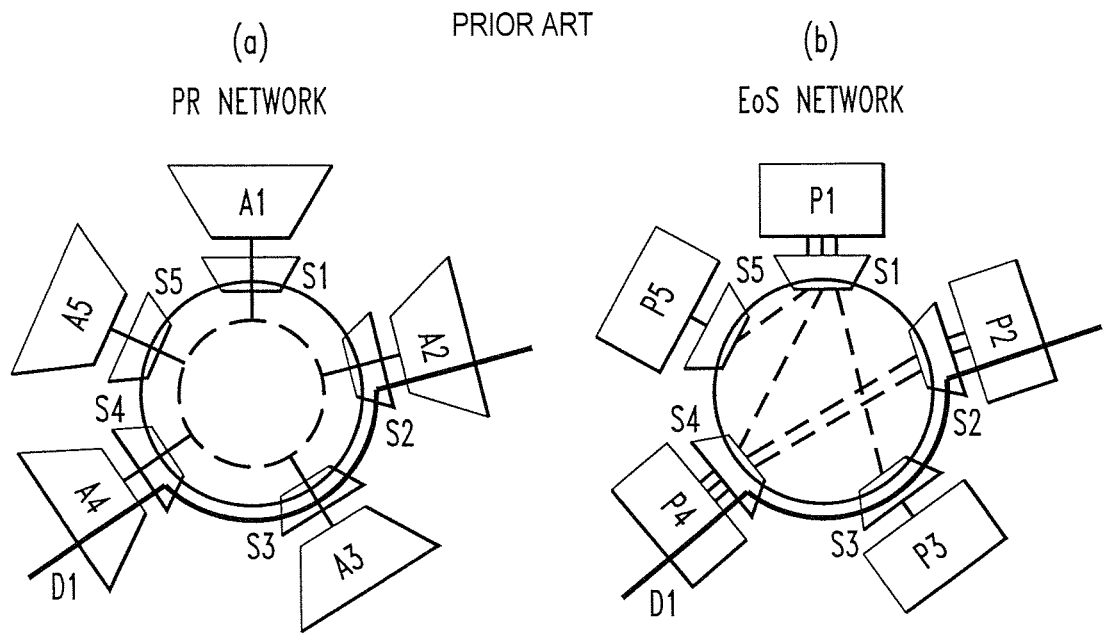
FIG. 1(a) illustrates a packet ring network.
FIG. 1(b) illustrates an Ethernet-Over-SONET network.

Principles of the invention will be illustrated herein in conjunction with the EOS and PR models for SONET (SDH) networks. It should be understood, however, that the invention is not limited to use with such models and networks, but is instead more generally applicable to any packet-aware transport environment in which it is desirable to more effectively provide for data volume growth.

It is to be appreciated that, as used herein, the term "pipe" generally refers to a communication channel, e.g., a SONET pipe is a communication channel in a SONET network used to transmit data or voice.

Principles of the present invention realize that the EOS and PR approaches each have their benefits and disadvantages. Thus, illustrative embodiments described herein are directed toward the PR model and how one may improve it in an environment that observes rapid data growth and consequently, significant traffic churn. In one embodiment, a new architecture (referred to herein as a hybrid ring architecture) is provided that makes selective use of EOS pipes in conjunction with the PR model to create a network that scales gracefully to rapid growth in data traffic.

The remainder of the detailed description is divided into the following sections for convenience of reference. In section I, we motivate the hybrid ring architecture. Then, in section II, we formulate the setup failure re-arrangement problem (SFR), that is used to design the hybrid ring, and highlight the various subproblems that need to be solved to address this problem. We provide an algorithm for SFR in section III and then present simulation experiments and results in section IV. Section V explains certain hardware and management considerations, while section VI describes an illustrative computing system for use in implementing the methodologies described herein.

I. Hybrid Data-Ring Architecture

In this section, we provide a high-level motivation for the hybrid ring architecture. First, we make a few pertinent observations about the PR model:

The PR model requires the links in the VDR to be the same size on all hops of the ring. This is to ensure sufficient bandwidth exists to automatically reroute the traffic during failure. However, this also implies that the most loaded hop determines the size of the VDR.

The ELC on a node is used to switch two types of packets—traffic that adds/drops at the node and traffic that is "pass-through," i.e., destined for another node further along the ring.

The data switching capacity of the ELC on commercially available PRs is usually lower than the total optical capacity of the ring. Thus, new data service requests may be refused if the VDR has no spare capacity even though bandwidth exists in the remainder of the SONET ring.

Given these observations, we use the following example to highlight the drawbacks of scaling the PR model to increasing volumes of data traffic. Consider the design of a five-node STS-12 size ring with each node having an ELC with switching capacity of 300 Mbps (corresponding to STS-6 worth of switching capacity).

In the EOS model, the required switching capacity at each node is computed as the sum of the capacities of all data "links" emanating on that node. In the PR model, it is twice the size of the VDR (sum of the east-side and west-side capacity, that can be dropped at the node). For example, switching capacity of 300 Mbps translates to an STS-3 VDR. Let the nodes be numbered A-E and consider the need to support five demands on the data topology between different node pairs—demand D1 of 60 Mb between A and C, D2 of 80 Mb and D3 of 10 Mb between D and A, D4 of 100 Mb between E and D and D5 of 60 Mb between C and D.

Figure 2:
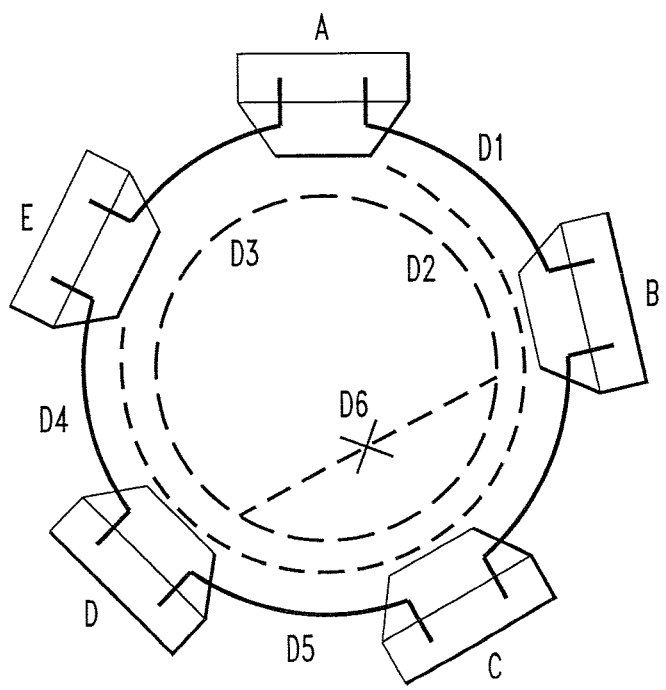
FIG. 2 illustrates a packet ring model.
Figure 3:
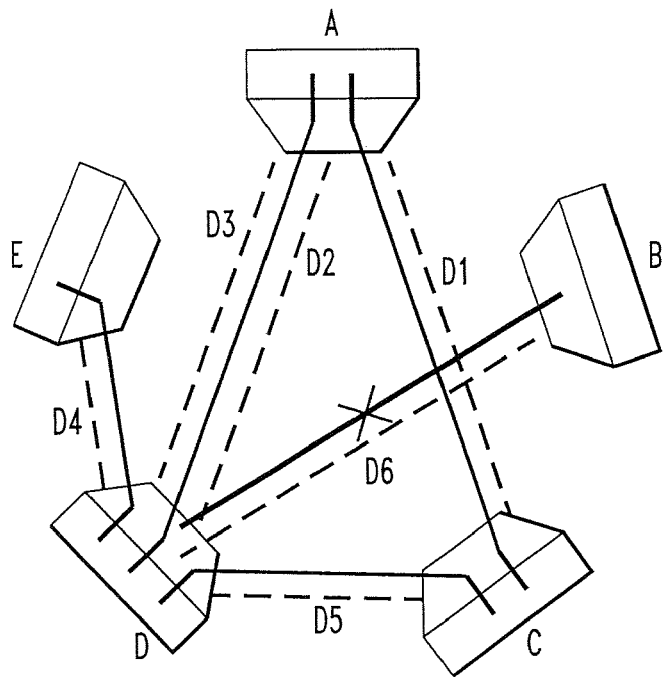
FIG. 3 illustrates an Ethernet-Over-SONET model.

FIGS. 2 and 3 show how these demands would be routed in the data network following the PR and EOS models, respectively. Now assume that there is a new demand D6 for 40 Mb between nodes B and D. As the two figures show, it would be rejected under both the models.

Consider the PR case (FIG. 2). Since each pass-through demand uses twice the switching capacity, once on the east-side link and once on the west-side link, 280 Mb of switching capacity is used up at node B to support the two pass-through demands D1 and D2. This leaves only 20 Mb spare capacity which is not enough to add/drop this new demand. Therefore, unless the size of the VDR and hence the switching capacity is increased, it is not possible to satisfy all demands. Nodes like B, that are congested due to pass-through demands, are referred to as "bottleneck" nodes. The data switching capacity which could have been more advantageously used to support demands that add-drop at these nodes, is being used by pass-through demands. The important point to note is that even though we are using shortest path routing to route demands on the VDR, this problem of inefficient utilization of switching resources arises even with complex ring loading schemes that balance the load on the ring.

The EOS case (FIG. 3) rejects this new demand for a different reason. Since EOS pipes are dedicated to each pair of nodes between which there is a demand, each of the five existing demands map to a pipe of the closest STS granularity. All EOS pipes, shown in dark bold lines in the figure, are of size STS-1-2v and the dotted lines denote the demands that each EOS carries. Demands between the same pair of nodes, like D2 and D3, can be multiplexed on the same EOS pipe. Creating these EOS pipes results in dividing up the switching capacity at the nodes and may reduce the overall efficiency of the network. For example, the 60 Mb demand between nodes C-D is carried over an STS-1-2v pipe (100 Mb), at only 60% bandwidth efficiency. The 300 Mb switching capacity at node D is used up by the EOSs created to carry the four services originating at the node. Consequently, even though the destination node (B) has spare capacity, demand D6, which requires the creation of a new STS-1 EOS pipe between B and D, is rejected due to lack of switching resources at D. Only by increasing the switching capacity at node D, can this new demand be met.

This simple example highlights the tradeoffs between the PR and EOS approaches. In EOS, the switching capacity of a node is utilized only at the source and destination node for any demand. However, the efficiency may be lower since fewer demands can be stat-muxed (statistical time division multiplexed) onto an EOS pipe. On the other hand, a node may exhaust its switching capacity, routing "pass-through" traffic in the PR model, thereby disallowing new requests even though there may be available capacity overall.

Figure 4:
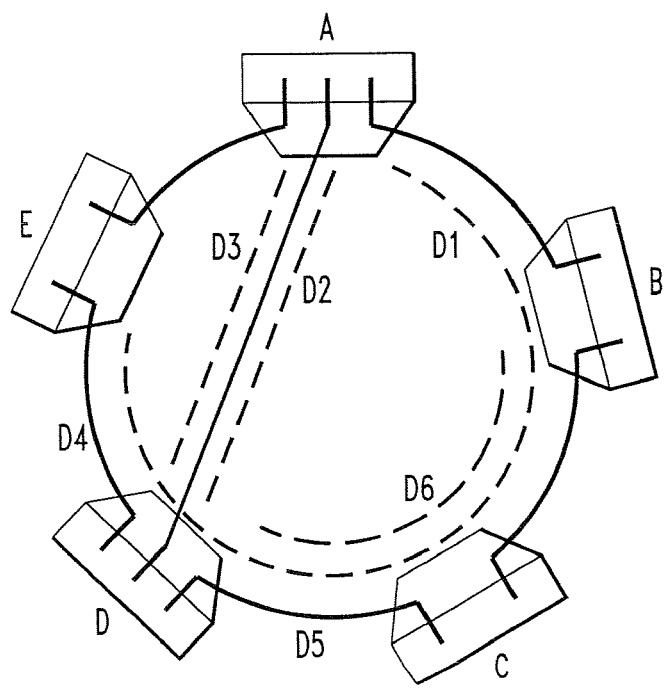
FIG. 4 illustrates a hybrid ring model, according to an embodiment of the present invention.

Principles of the invention therefore provide a hybrid ring architecture that uses EOS pipes in conjunction with the PR model to achieve an improved architecture. FIG. 4 shows how use of a hybrid ring model according to the invention advantageously allows for all the demands from the last example to be met. A VDR of size STS-1-2v in conjunction with an EOS pipe of size STS-1-2v between nodes D and A to carry demands D1 and D2 still needs 300 Mb of switching at nodes A and D but only 100 Mb switching at nodes B, C and E. This VDR has enough free capacity to carry demand D6. Thus, the hybrid ring architecture can support more data traffic for lesser switching capacity than either PR or EOS architectures.

Thus, one key algorithmic challenge for the hybrid ring architecture is the hybrid network layout problem, namely, how do you determine the number and size of the EOS pipes and the appropriate size of the VDR. From an algorithmic viewpoint, there are a number of ways to address this problem. One approach would be to formulate a network design problem—given a set of demands, what are the optimal set of EOS pipes and the VDR size that can support the demands. However, while a design approach is appropriate for a greenfield environment, we seek a solution that could operate at run-time on a network that carries live, operational traffic. Moving an operational network from one design to another is a hard problem and can be reduced from the between-ness problem Therefore, principles of the invention perform hybrid network reconfiguration (HNR) that supplements the existing network with new EOSs and leads to a gradual growth of the virtual data network. A goal is to then be able to provision more demands on the EOS pipes just created or, along the VDR. HNR is the focus of the remainder of the detailed description.

II. Hybrid Network Re-Configuration Problem

In this section, we outline the specific theoretical problem we seek to solve and highlight some of the key sub-problems that have to be addressed for an effective solution to the HNR problem.

As shown in the example above, new data requests cannot be provisioned on the VDR, because one or more nodes no longer have sufficient spare data switching capacity. Therefore, to solve the HNR problem, principles of the invention provide for creating one or more EOS pipes to bypass such "bottleneck nodes." Rerouting pass-through demands from these nodes to the new EOSs, frees up switching capacity that can now be used to support add-drop data traffic. This re-configuration can be performed in a pro-active manner in anticipation of future requests, or it can be a reaction to a pre-defined trigger such as failure to provision new data demands. Since performing pro-active reconfiguration is a straightforward extension of the trigger-based reconfiguration, the description below focuses on the latter.

Formally, we aim to solve the setup failure re-arrangement (SFR) problem. Since a requirement in our illustrative case is to perform the re-configuration in the presence of live traffic, we seek to minimize any impact on the flowing traffic.

The SFR problem is as follows:

SFR Definition: Given the failure to setup a new demand in a VDR ring, derive a set of one or more EOS pipes such that:

a) provisioning of these EOS pipes enables this new demand to be met b) given a choice of EOS pipes, create the ones with the highest bandwidth efficiency metric (BEM).

BEM captures the cost-benefit ratio of creating an EOS and determines the efficiency of an EOS in utilizing network resources. It is used as the primary metric to select the set of EOS pipes to be created.

Clearly, we are addressing the HNR problem using a localized heuristic reconfiguration. However, we do so because we are looking for an effective, practical solution that causes minimum disruption and not a wholesale network wide redesign, and indeed the simulation results below justify the efficacy of the approach.

The SFR problem translates into solving two distinct sub-problems, namely, the bottleneck selection problem and the EOS selection problem, and we highlight both of these problems below.

Nodes that carry pass-through traffic are potential candidates for bottleneck selection as rerouting such traffic can relieve the congestion on the node. Identification of these bottleneck nodes is straightforward if a specific demand fails to setup—all nodes without sufficient capacity on the selected path for this new demand qualify as bottlenecks. However, if this optimization is done in a pro-active manner as mentioned above, the choice of which nodes will become bottlenecks may be less obvious. Some possible candidates are nodes that use up more than x% of there switching capacity for pass-through traffic. In any case, for this discussion of the SFR problem, we will assume that the bottleneck nodes are given as input to the reconfiguration. The objective of the SFR problem is to relieve the bottlenecks by rerouting the pass-through traffic to bypass these nodes. Further we assume that appropriate graph transformation (see, e.g., J. L. Gross and T. W. Tucker, "Topological Graph Theory," Book News, Inc., 2001) can be applied to the network in such a way that the problem can be converted to relieving bottleneck links.

Given a set of bottleneck links, there are multiple ways that new EOS pipes can be created, to bypass the bottleneck links, all of which will achieve the target—a tradeoff is to determine the comparative value of additional resources the EOS will use and the amount of data switching capacity it frees up on the nodes.

Consider FIG. 5(a). There are five existing demands on a VDR of size STS-1-3v. Demands D1 and D4 between nodes B and D are both of size 40 Mb. Demand D2 between nodes B and C is of size 70 Mb, D3 between E and C of size 20 Mb and D5 between C and D of size 150 Mb. Now there is a new request for a 60 Mb demand between A and C which cannot be satisfied on the existing VDR as node A is bottle-necked due to pass-through demands. FIGS. 5(a), 5(b) and 5(c) show the three potential EOS pipes that can be created to clear the bottleneck at node A and we use these to highlight the various factors that influence EOS selection.

BEM: The benefit of an EOS pipe can be measured by the amount of switching capacity it saves on the bottleneck links. The cost can be computed based on the amount of underlying SONET bandwidth it uses to realize this EOS and the switching bandwidth that is wasted due to the creation of this dedicated pipe. Since in most networks of today, optical capacity is underutilized and data traffic is growing, the cost of using the optical resources is not a primary concern and wasted capacity primarily drives the cost of the EOS.

Consider the potential EOS pipes in FIG. 5(b) and FIG. 5(c). An EOS (E1) of size STS-1-1v (51 Mb) between C and E, as shown in FIG. 5(b), that carries demand D3 wastes 31 Mb bandwidth and needs a peak switching capacity equivalent to STS-7 at C and E and STS-6 at all other nodes. On the other hand, an STS-1-2v (102 Mb) EOS (E2) between B and D, as shown in FIG. 5(c), that carries demands D1 and D4 wastes only 22 Mb of EOS space but needs a peak switching capacity equivalent to STS-8 at B and D and STS-6 at all other nodes.

Thus creating E2 is definitely more efficient from the point of view of wasted bandwidth. But E1 is closer in size to the failed demand and needs only an additional STS-1 switching capacity at both the end-nodes as compared to E2 that needs additional STS-2 switching capacity. Thus, creating E1 may be more beneficial in the short-term even though E2 is more efficient. In fact, no matter how efficiently one may pack an EOS, creating one that is disproportionately large limits how much the virtual data network can grow (since the switching capacity of an ELC is fixed). Consequently, when creating new EOS pipes, these two independent factors need to be balanced and the BEM metric below aims to do so:

$$BEM=(MB-LS)-k*LS/DB$$

where,

LS is the size of the EOS pipe (in Mb) being considered,

MB is the statistically multiplexed bandwidth of all demands that the EOS will carry and DB is Requested bandwidth of the failed setup demand MB−LS is a measure of bandwidth that is wasted on the link and clearly this waste is minimum if the complete link can be filled up with multiplexed demands. LS/DB determines the relative size of the EOS link as compared to the size of the failed demand. The factor k determines the relative weight of these two components on the efficiency of the EOS pipe.

Alternatively, the efficiency of wasted bandwidth can also be computed based on the number of nodes on the VDR that the EOS bypasses. For example, an EOS that saves switching capacity on 5 nodes may be preferable to one which saves capacity on 2 nodes even though it may waste slightly more bandwidth. If optical capacity is of concern it may also have to be considered while defining the BEM. Even though various such factors can be combined to form a different heuristic for BEM that selects the set of EOS with which to supplement the hybrid ring, the efficacy of the BEM formulation defined above, can be seen from the simulations below.

EOS Routing Model: The management overhead required to route the demands in the hybrid ring is another factor that determines if a particular EOS design is feasible. In FIG. 5(c), the STS-1-2v EOS carries demands D1 and D4 between nodes B and D and frees up 80 Mb of VDR space at both nodes E and A. In this design, only demands between the end-points of EOS are routed on the EOS, the other demands are routed on the VDR. We call this routing model "direct routing" (DR).

An alternative way to design an EOS is shown in FIG. 5(d). The STS-1-2v EOS between B and E bypasses node A and can be used to carry any demands that are passing through node A. The demands are then dropped at B and E and then added back to the VDR to be carried the rest of the way to their final destination. For example, D1 and D4 are carried on the EOS from B to E and then dropped at E to be carried on the VDR to be finally dropped at D. Similarly D3 is also routed for part of its route on the EOS and for the other part on the VDR. This routing model is called "indirect routing" (IDR). Note that the peak switching capacity required in this example is STS-8 at nodes B and E, which is the same as the switching required in FIG. 5(c) at nodes B and D though the EOS in this case is much better utilized as it is completely full. Thus, this methodology can lead to better efficiency by allowing any demand to be multiplexed on the EOS but may require a more sophisticated routing and management scheme. Several factors that influence the decision of what routing model to use in hybrid ring are further discussed below. Even though, in this illustrative explanation, we focus on the DR model that allows demands to use either EOS or VDR but not both, it is to be understood that using other routing models would also provide the advantages of the hybrid ring model.

Statistical Multiplexing Scheme: In case of bursty data traffic, the bandwidth requirements are defined by a committed information rate (CIR) and a peak information rate (PIR) and the difference between the PIR and CIR is called excess information rate (EIR). For a non-bursty demand, CIR is same as PIR. The statistical multiplexing schemes used to aggregate data streams determine the minimum required bandwidth or the multiplexed bandwidth (MB) on the shared resource, be it PR or EOS.

Consider a simple multiplexing scheme:

$$MB=\Sigma CIR_i+OF/100*\Sigma EIR_i$$

where OF is the over-provisioning that is required to support the PIR. Note that making the OF 100% would mean that the PIR of all the demands have to be supported simultaneously whereas OF=0 means that only the CIR has to be supported. The service provider may set this OF between 0 and 100 based on the service guarantees that have to be provided.

Consider an example with three bursty demands that need to be multiplexed on a single shared link. Let these demands have the following (CIR, PIR) bandwidth requirements: D1 with (20 Mb, 50 Mb), D2 with (20 Mb, 200 Mb) and D3 with (30 Mb, 50 Mb). The CIR sum on the link is 70 and the sum of excess information rate (EIR) is (50−20)+(200−20)+(50−30)=230 Mb. With OF of 50%, MB=185 Mb and therefore requires the size of the link to be at least STS-1-4v (204 Mb) whereas with OF=33%, MB=147 Mb, and hence an STS-1-3v link should be enough to support all the demands. But D2 has a PIR of 200 Mb and to support this PIR, the link size has to be at least STS-1-4v (204 Mb). Therefore, the required bandwidth on the link can be computed as max (MB, max (PIR$_i$)). Since the link granularity is STS-1 (51 Mb), the link size (LS in STS) is computed as:

$$LS=\text{ceil}(\max(MB,\max(PIR_i))/51).$$

There are many other schemes to compute the MB and one of them is based on the number of data streams being multiplexed on the link. For the illustrative embodiment here, we use the simple multiplexing scheme formulated above to determine if the VDR has enough bandwidth to accommodate a new demand and also to determine the required size of an EOS pipe. The MB computed using this formulation is then used to determine the EOS efficiency as described above in this section.

Candidate Demand Set Selection: Once the bottleneck links are selected, a set of demands that can be rerouted has to be chosen. The choice of these demands depends on the service level agreements (SLAs) or the properties of the demand. For example, demands whose SLAs penalize even temporary service degradation should never be rerouted. The demand properties also determine if it is best routed on VDR or an EOS. For example, a private line demand should be routed on an EOS if the SLA does not allow multiplexing with other demands whereas a multicast or broadcast demand is a good candidate for routing on VDR as it requires less resources. These and other criterion should be used to determine a candidate set of demands that can be rerouted without affecting the service quality.

III. SFRA Algorithm

In this section, we present the SF'RA algorithm for reconfiguring the virtual data network when a new request for data service is rejected. The SFRA algorithm is shown in FIG. 6. In this illustrative algorithm, any time a new EOS is created, the switching capacity required by the EOS is added to the end-nodes switching capacity, provided it does not exceed the maximum limit for this node. The freed up switching on the nodes in the packet ring can then be used by other demands.

As indicated in FIG. 6, the input to the algorithm is: (i) the rejected demand d between source-destination pair (o, t) and its $CIR_d$, $PIR_d$ requirement; and (ii) the bottleneck links BL. The output is: (i) the new route for the rejected demand; or (ii) a failure indication (i.e., no new route is available for the rejected demand).

Step 1 of the algorithm is to create a list of demands that use any links in set BL. Step 2 is to sort these demands in sets $P_{s,d}$ based on the src-dest pair s,d of the demands and add the rejected demand in the set $P_{o,t}$. Step 3 is to call function designEOS( ) for each set to compute the potential EOS with its size and efficiency. Step 4 is to select the EOS which has the most efficiency. In step 5, if no EOS could be found, the algorithm goes to step 9. If an EOS is found, but there is a scarcity of optical resources or switching capacity at EOS end-nodes, then step 6 directs to skip that EOS and return to step 4. If there is no such scarcities, then step 7 directs to allocate optical resources to this EOS between s, d and reroute the demands in the set $P_{s,d}$. Step 8 directs that if BL still do not have enough spare capacity for d, then return to step 4. Step 9 directs that if BL is still not free, then return a failure indication, else return success in step 10.

It is to be appreciated that the function designEOS called in step 3 computes MB, LS and BEM as defined in FIG. 6.

By way of example, consider FIG. 5 and assume that the underlying SONET ring is STS-12 and switching capacity can be increased to the maximum capacity. Since the new demand between node A and C is rejected, this demand and its bandwidth requirements are fed to the algorithm. Also, node A being the bottleneck node, link A-B on the shortest route A-B-C is fed to the algorithm as the bottleneck link. Using step 1 and 2, the algorithm creates two sets—$P_{E,C}$={D3}, $P_{B,D}$={D1, D4}. The function designEOS is used to compute two potential EOSs, E1 between E and C with MB=20 and LS=1 and E2 between B and D with MB=80 and LS=2. For E1. BEM=(20−51)−51/20=−33.5 and E2's BEM=(80−102)−102/20=−27.1. Step 4 selects E2 as it is most efficient, and since there is enough optical bandwidth and switching capacity, the algorithm allocates resources for this EOS in step 7 and reroute D1 and D4. Step 8 determines that enough capacity has been freed at bottleneck link A-B and the algorithm returns success and D6 can now be routed on the VDR.

IV. Simulations

In this section, we illustrate the efficiency of the hybrid ring of the invention as compared to a PR network, as the data traffic in the network grows. We start by describing the simulation model that is used for the network and then present some results on the performance of the SFRA algorithm.

A. Simulation Model

We use a testbed of an OC-192 SONET ring with eight nodes that is used to create the appropriate virtual data network. In addition, the maximum switching size in the network is specified and it limits the amount of data traffic that can be provisioned in the network. As explained above, the PR model carries all its data traffic on a VDR and the hybrid ring model carries data traffic on a combination of VDR and EOS pipes.

A goal of the experiments is to satisfy as many incoming data demands as possible. In both PR and hybrid ring models, we start with a VDR of size STS-1-48v and grow the virtual data topology until the SONET ring capacity is exhausted or the maximum switching capacity is reached.

In the PR model, on setup failure, a packet ring algorithm (PRA) grows the VDR by the minimum bandwidth required to satisfy the rejected demand. For example, consider a VDR of size STS-1-3v that is completely full. To satisfy a new demand of size 40 Mb between any two nodes, increasing the VDR size to STS-1-4v is sufficient. The VDR can grow until there are available resources in the optical domain and the maximum switching capacity is reached.

In the hybrid ring model, on setup failure, an SFR algorithm is called, that creates or modifies a set of EOSs in order to satisfy the new request. For our simulation, we are using the DR routing model where demands are not allowed to straddle both EOS and VDR.

To study the performance of the SFRA algorithm, we compare it to a simple SFR algorithm called SFEA presented in FIG. 7. The SFEA and SFRA algorithms differ in the way they decide which EOS to provision in the network. In SFEA, EOS creation is straightforward as opposed to the SFRA where efficient EOS design is a key. In SFEA, either an existing EOS pipe is enlarged (step 1) or a new EOS pipe is created (step 2) between the end nodes of the rejected demand. Whereas in SFRA, EOS pipes are created or modified to bypass bottleneck nodes, in order to satisfy the rejected demand. It may lead to rerouting of some existing demands in the network as explained above. Lastly, in SFEA, if enough available optical and switching resources are available, resources are allocated (step 3) to the EOS and the algorithm returns the EOS as a feasible route for d, else a failure is returned (step 4).

To simulate data growth, new requests for data demands are made between randomly selected pairs of nodes. In the graphs presented in FIGS. 8 through 12, the number of demands that were requested until any point of time are represented by NRD. The bandwidth of the data demands is defined in terms of (CIR, PIR) values. For bursty demands, the PIR is randomly selected to be either 10 MB, 100 MB or 1000 MB/1 GB, to correspond with Ethernet rates and the CIR is a randomly generated number between 0 and PIR. A 1000 MB PIR demand is generated less frequently than smaller demands to mimic the nature of real traffic in the network.

B. Illustrative Performance Results

In this section, we compare the performance of PR and the two algorithms for hybrid ring, SFRA and SFEA. The primary performance metric is the provisioned data volume (PDV) that indicates the amount of data traffic that could be actually provisioned on the virtual data network. This PDV can directly be translated into revenue generated by this data network. In case of bursty demands, the (PDV) is the multiplexed bandwidth of all the demands provisioned in the network and this bandwidth is computed using the multiplexing scheme defined above in section II. Another performance metric is the required peak switching capacity (PSC) required at the maximally loaded data node. The amount of underlying optical bandwidth (UOB) that is used to create the virtual data network is another metric that determines the performance of the algorithms. We compute this UOB as the sum of bandwidth used on each link in the SONET ring by the virtual data network. For example, an 8 node STS-3 VDR will use 8×3=24STS optical capacity.

In order to limit the run time of the algorithms, we stop the experiment if we cannot satisfy 20 consecutive incoming data demands, as it means that the network is very saturated.

The switching capacity at each node in the following simulations is limited to STS-192. This means that in the PR model, the VDR can grow up to a maximum of STS-1-96v.

1) Simulation 1: Total Provisioned Data Volume: Consider FIG. 8. It compares the PDV for the PR, SFEA and SFRA. As expected, the PDV increases as new requests for data demands enter the system and are provisioned, but at some point, the algorithms start rejecting demands due to lack of resources. Note that the three algorithms may reject different demands as they have a different virtual data topology. The difference in PDV value at any given NRD captures the relative rejection rates of the three algorithms. As can be seen from the comparison of the PDV for NRD values between 100 and 200, the PRA starts rejecting demands much earlier than either the SFRA or the SFEA algorithm. In addition, the PRA supports substantially less data volume in the end, than either of the hybrid ring algorithms.

A comparison of the SFRA and SFEA performance shows that SFEA starts rejecting demands earlier than SFRA and supports almost 18% less data volume. This shows that intelligent design of EOS, as provided by SFRA, can add substantially to the advantages of using a hybrid ring. As seen from FIG. 8, SFRA supports almost 70 percent more data volume which can be directly translated into an increase in service provider revenue. Moreover, as the next few experiments demonstrate, this increased data volume is supported with lesser switching requirements and minimal increase in the usage of underlying optical capacity.

Figure 9:
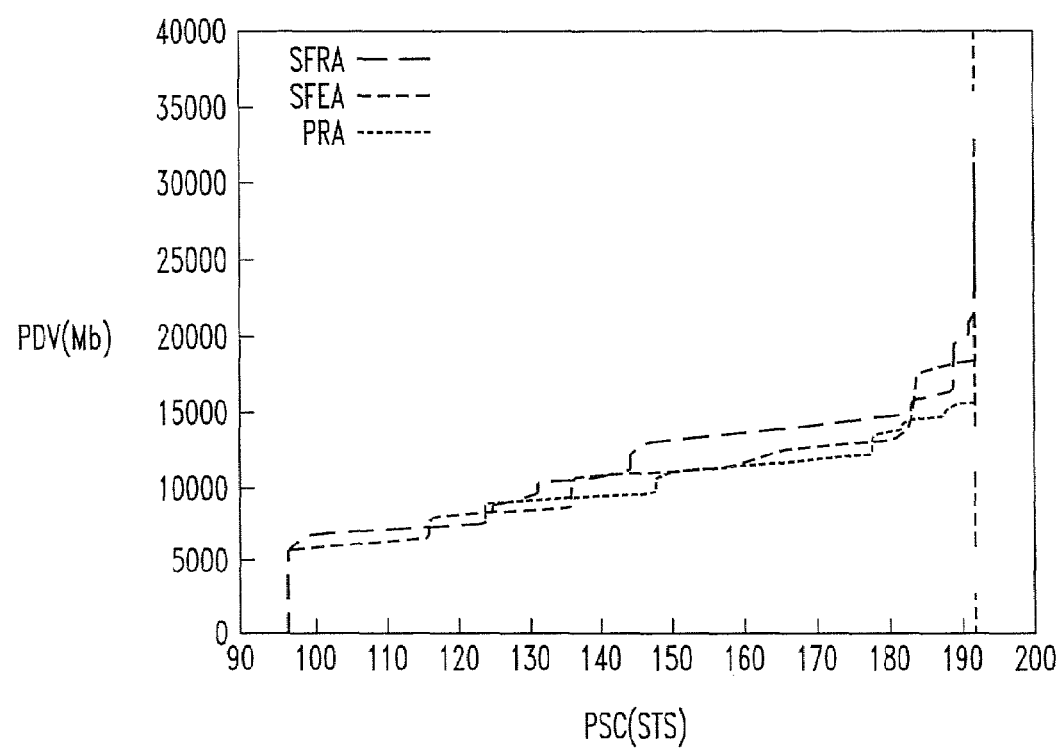

2) Simulation 2: Comparison of Peak Switching Capacity: FIG. 9 compares the required switching capacity of the most loaded node. All three algorithms mentioned above start with the peak switching capacity of STS-96 as required by the VDR of STS-48. Once the current switching capacity cannot satisfy incoming demands, all three start requiring more switching capacity. As the figure shows, the SFRA supports more PDV for the same switching capacity than either the PRA or the SFEA.

Another way to look at this graph is to consider the peak switching capacity required to support a given amount of data volume. As expected, the peak switching capacity required by SFRA is less than that required by the PRA as it tries to avoid using switching capacity for pass-through traffic. An interesting result is the superior performance of SFRA as compared to SFEA as SFEA always creates direct EOS pipes for all new demands once the VDR is full and would have been expected to use lesser switching capacity. This shows the efficiency of the SFRA in creating EOS pipes as compared to the more simplistic EOS creation as in SFEA. Note that since PRA requires all nodes in the ring to have the same switching capacity and nodes in the hybrid ring can have different switching capacities, the cost of the entire virtual data network is substantially more in PRA than in SFEA.

Figure 8:
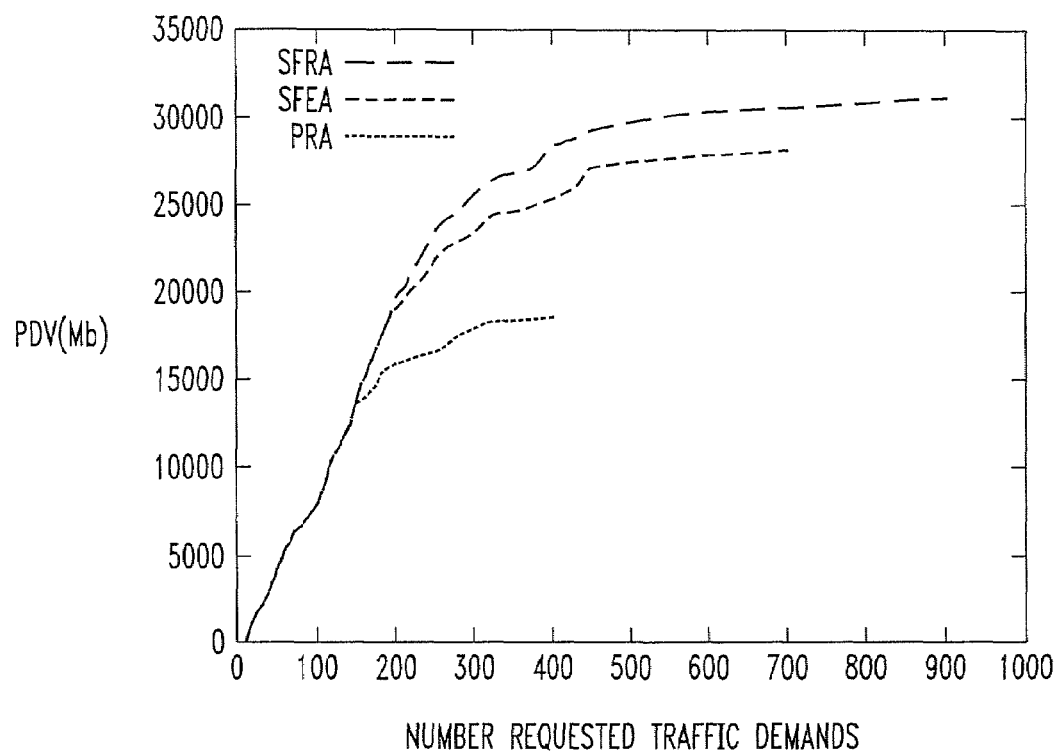
FIGS. 8 through 12 illustrate simulation results, according to embodiments of the present invention.
Figure 10:
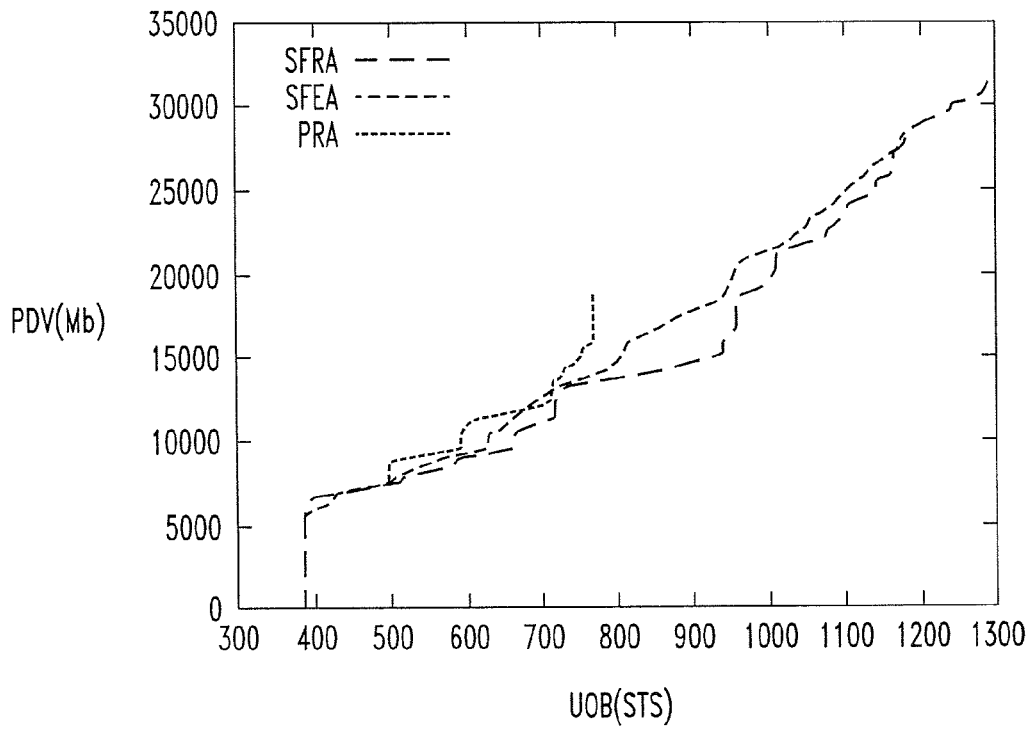

3) Simulation 3: Optical Bandwidth usage as measure of cost: In addition to the cost of the required switching capacity, the cost of creating a virtual data network network is also measured by the amount of the underlying optical bandwidth used to create the virtual data network. FIG. 10 plots this increasing optical bandwidth usage for each of the three algorithms as the network grows, starting from the identical VDR with UOB as 8×48=384 STS. As expected, the SFRA needs optical bandwidth as it creates multiple point-to-point EOS pipes as compared to the PRA which creates a single shared VDR. The point to note is that this difference is quite small until the PRA has reached the maximum switching capacity and can grow no more, thereby rejecting most requests. Since the SFRA is still accepting most demands that enter into the system at this point as seen in FIG. 8, we stop the comparison at this point. Even though SFRA supports less data volume than the SFEA at some points, the UOB for both grows hand-in-hand and, at the end, SFRA supports more data traffic. Since, in todays networks, the optical bandwidth is underutilized and the data demands are growing, this little increase in the usage of optical bandwidth by the SFRA is more than offset by the increased volume of data traffic that can be provisioned in the network using lesser switching capacity.

The above simulations were based on the assumption that most optical networks, supporting data traffic, will have lower switching capacity than optical capacity, as mentioned above. But the advantages of the hybrid ring hold even when this assumption does not hold and the data switching capacity on a node is the same as the optical capacity. The following few examples demonstrate this in an OC-192 SONET ring network where the data switching capacity at each node equivalent to STS-384 which means that the VDR can grow up to STS-192.

Figure 11:
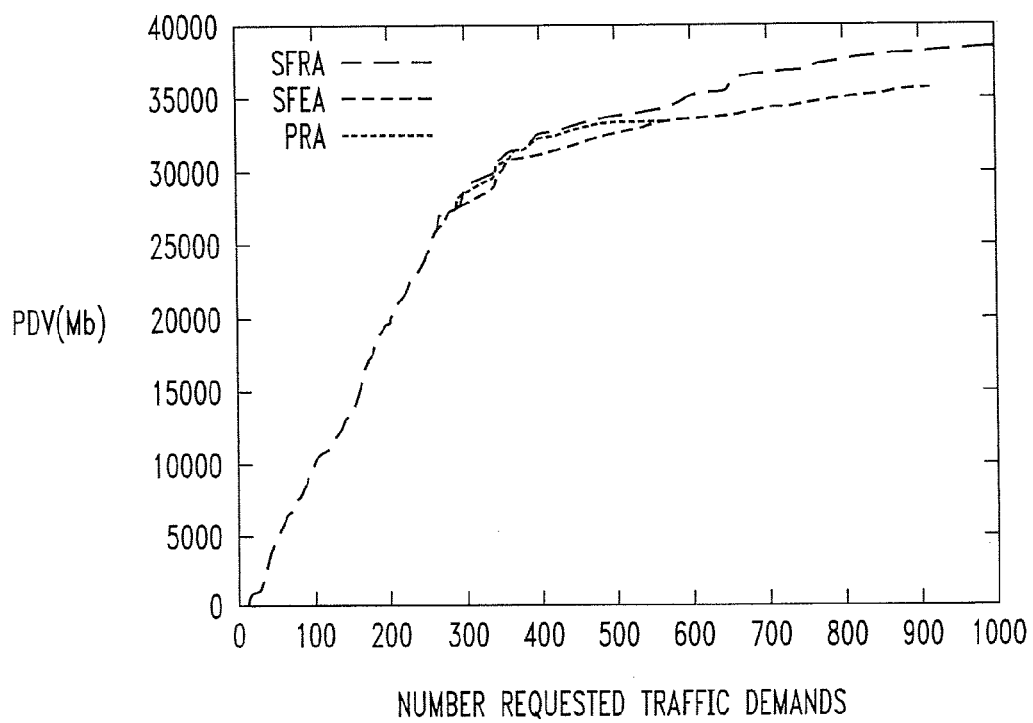

4) Simulation 4: Total Provisioned Data Volume: FIG. 11 shows that the SDT increases as new requests for data demands enter the system and at some point a few demands start getting rejected. Until about 500 demands, the data volume supported by the Packet Ring and SFRA is almost the same, but between 500 and 600 demands the virtual data network in PRA gets saturated and cannot support more data whereas the SFRA keeps accepting more demands and ends up supporting almost 15 percent more data volume. SFEA, on the other hand, starts rejecting demands earlier than both the PRA and SFEA and supports lesser data volume than both until the PRA stops. At the end, SFEA supports some more data volume than the PRA but since this increase is achieved at the cost of early rejections it may not be a lucrative solution. The SFRA consistently outperforms SFEA and supports almost 8 percent more data volume than SFEA. This shows that creating EOS pipes efficiently in the hybrid ring is crucial to the success of the hybrid ring and that SFRA does this job very well.

Figure 12:
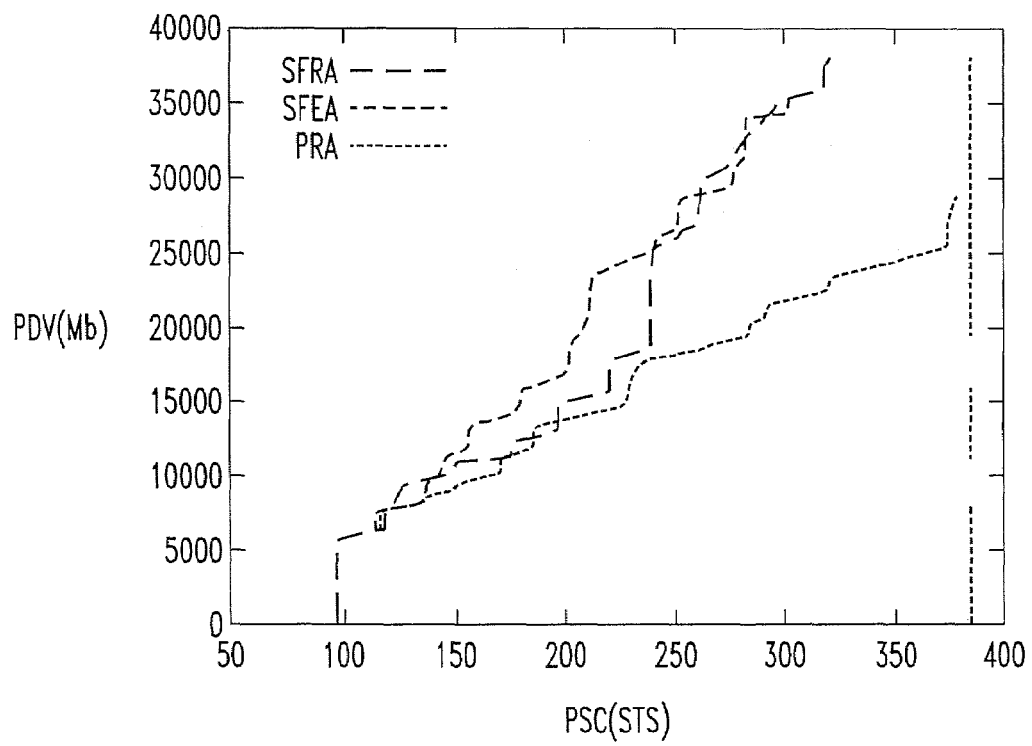

5) Simulation 5: Peak Switching Capacity: In FIG. 12, SFRA supports more PDV for the same switching capacity than PRA going up to 45 percent or more after PSC after 250 STS. Looking at the flip side of this graph, SFRA requires almost 30 percent less switching capacity than PRA for supporting the sane volume of data traffic. As expected, SFEA starts with supporting more data traffic for the same switching capacity, but it also rejects more data demands as seen from FIG. 11. After PSC value 250 STS, the performance of SFRA catches up with SFEA and ends up supporting more data volume. Note that SFEA and SFRA do not reach the maximum switching capacity as they exhaust underlying optical capacity earlier. This behavior is consistent with the result in FIG. 10.

These simulations prove that SFRA is a good algorithm for creating a hybrid ring that can support substantially more data volume than PR and is efficient in its use of both data switching and optical resources.

V. Hardware and Management Considerations

This section discusses some of the challenges that have to be addressed for implementing the Hybrid Ring model.

A. Hardware

1) *Data Switching:* In packet-aware transport networks, a set of SONET channels is configured to carry data traffic and these channels are dropped, the data processed and the channels added back at the SONET ADMs. The data processing can happen either at an external node or at line cards on the SONET ADM. The key difference in PR and the hybrid ring model arises in the kind of processing required at this data processing node or line card. In PR, the data switching is restricted to a drop or forward decision, but in the hybrid ring model, full switching is required between the different EOSs and the VDR. So, each node in the hybrid ring employs a packet switch instead of a packet ADM with support for a routing table that can be configured based on the EOSs in the hybrid ring.

2) *Hitless Rerouting:* Relieving bottlenecks in the hybrid ring includes rerouting some demands and moving them from the VDR to EOS, and vice versa. Such a movement should not degrade the quality of that service. Any rerouting which satisfies the QoS (quality-of-service) guarantees of a service is called "hitless." All nodes should have the capability to provide hitless rerouting for the hybrid ring.

B. Network Management

1) *Fairness:* Another difference between the hybrid ring and PR model is in the traffic shaping and fairness algorithms. In the DR model explained divided between the VDR and EOS, separate fairness algorithms can be used for the two. For the VDR portion, back flow schemes such as those proposed in the RPR literature ("IEEE 802.17 RPR," IEEE Standard, 2004) can be used. Since an EOS carries traffic only between a single pair of nodes, traffic shaping can provide adequate fairness amongst the streams being multiplexed on an EOS. On the other hand, in the IDR scheme, where the data demand can hop from the VDR to the EOS and vice versa, since the fairness schemes based on back-flow will not work as the topology is now a mesh, a simple and efficient fairness algorithm for the IDR routing scheme for hybrid ring may be employed.

2) *Protection:* Both the EOS and VDR portion of the hybrid ring can have independent protection schemes in the DR scheme as they carry different data streams. The protection scheme for VDR is similar to ones for other PR schemes such as RPR ("IEEE 802.17 RPR," IEEE Standard, 2004). The protection scheme for EOS is based on the SONET protection scheme such as UPSR (Unidirectional Path Switched Ring) or BLSR (Bidirectional Line Switched Ring). We can improve on the BLSR scheme by only protecting the EOSs that carry demands with protection requirements. The rest of the demands can be put on the EOSs that are allocated resources from the unprotected pool. In the IDR scheme, restoration for demands that straddle both VDR and EOS may be done piecemeal, on the different segments of the route, through the node where it switches between. VDR and EOS is a single point of failure.

3) *Network Optimization:* The HNR problem described herein has focused on augmenting the VDR with appropriate EOSs in order to adapt the network to growing number of data demands. In an operational network, demands are added and deleted over time and the traffic pattern keeps changing. For example, there may be more demands between nodes A and B at some time and between B and C at other times. This means that the hybrid ring needs to keep evolving over time and this boils down to an optimization of virtual data network including resizing the VDR and adding, deleting and resizing of EOS pipes.

We have shown how to efficiently create new EOS based on traffic demands. Similar heuristics as BEM defined in section II can be used to determine when the EOS is too inefficient to be feasible. For example, any EOS where the multiplexed bandwidth is a small percentage of the EOS bandwidth is too underutilized to be efficient. This information can then be used to either down-size the EOS or to reroute the demands on the EOS onto the VDR or other EOSs and then release this EOS. The resources released by this EOS can be utilized by an EOS between other nodes that are more in demand. Over time, this selective reconfiguration will lead to a data topology that is more completely in tune with the changing traffic pattern than the PR model.

VI. Illustrative Computing System

Figure 13:
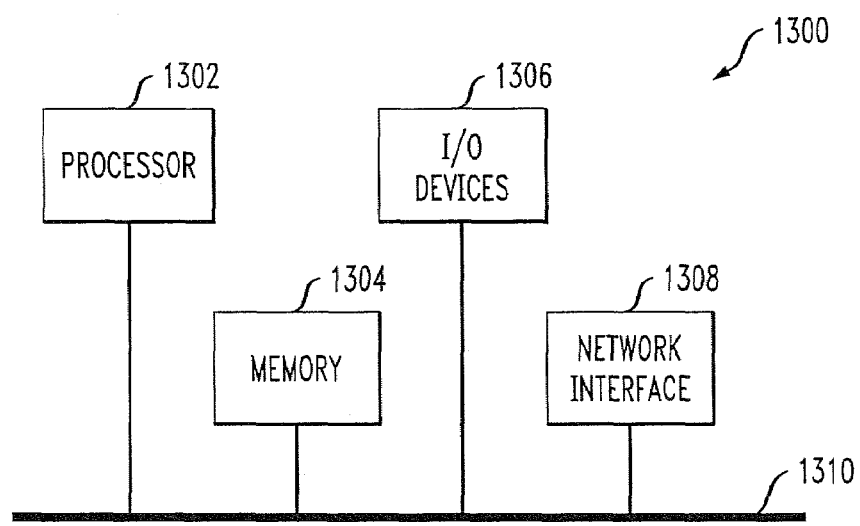
FIG. 13 illustrates a computing system suitable for implementing one or more setup failure re-arrangement methodologies, according to an embodiment of the present invention.

Referring now to FIG. 13, a block diagram illustrates a generalized hardware architecture of a computer system suitable for implementing a system for performing the setup failure re-arrangement methodologies (e.g., the SFRA algorithm of FIG. 6, the SFEA algorithm of FIG. 7), according to an embodiment of the present invention. More particularly, it is to be appreciated that computer system 1300 in FIG. 13 may be used to implement and perform the methodologies of the invention, as illustratively described above in the context of FIG. 1 through FIG. 12. Also, it is to be understood that one or more network elements (e.g., ADMs, packet processing nodes, routers, etc.) may implement such a computing system 1300. Of course, it is to be understood that the invention is not limited to any particular computing system implementation.

Thus, computing system 1300 could be used to determine a new route for a rejected demand and a hybrid ring architecture for implementing same, in accordance with the methodologies of the invention described herein, such that the route and architecture could then be implemented online on the subject network by a service provider.

In this illustrative implementation, a processor 1302 for implementing at least a portion of the methodologies of the invention is operatively coupled to a memory 1304, input/output (I/O) device(s) 1306 and a network interface 1308 via a bus 1310, or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

In addition, the phrase "I/O devices" as used herein is intended to include one or more input devices (e.g., keyboard, mouse, etc.) for inputting data to the processing unit, as well as one or more output devices (e.g., CRT display, etc.) for providing results associated with the processing unit. It is to be appreciated that such input devices may be one mechanism for a user to provide the inputs used by a system of the invention to generate results. Alternatively, the inputs could be read into the system from a diskette or from some other source (e.g., another computer system) connected to the computer bus 1310. Also, inputs to the methodologies may be obtained in accordance with the one or more input devices. The output devices may be one mechanism for a user or other computer system to be presented with results of the methodologies of the invention.

Still further, the phrase "network interface" as used herein is intended to include, for example, one or more devices capable of allowing the computing system 1300 to communicate with other computing systems. Thus, the network interface may comprise a transceiver configured to communicate with a transceiver of another computer system via a suitable communications protocol. It is to be understood that the invention is not limited to any particular communications protocol.

It is to be appreciated that while the present invention has been described herein in the context of networks, the methodologies of the present invention may be capable of being distributed in the form of computer readable media, and that the present invention may be implemented, and its advantages realized, regardless of the particular type of signal-bearing media actually used for distribution. The term "computer readable media" as used herein is intended to include recordable-type media, such as, for example, a floppy disk, a hard disk drive, RAM, compact disk (CD) ROM, etc., and transmission-type media, such as digital or analog communication links, wired or wireless communication links using transmission forms, such as, for example, radio frequency and optical transmissions, etc. The computer readable media may take the form of coded formats that are decoded for use in a particular data processing system.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 1302.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

It is also to be appreciated that the methodologies described herein may be performed by one or more of the network elements and/or by a dedicated controller in the network.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method of determining a route for a given demand in a circuit-switched data communication network, comprising the steps of:

obtaining via a computing system the given demand to be routed in the circuit-switched data communication network, wherein the circuit-switched data communication network implements a packet ring (PR) model such that one or more demands are routable on one or more virtual data rings in the circuit-switched data communication network;

specifying via the computing system an Ethernet-Over-SONET (EOS) communication channel in the circuit-switched data communication network suitable for accommodating the given demand; and identifying via the computing system one of the EOS communication channel and one of the one or more virtual data rings as a route for the given demand such that the circuit-switched data communication network operates in a hybrid architecture wherein one or more EOS communication channels are selectively used in conjunction with the one or more virtual data rings specified in accordance with the PR model to route demands in the circuit-switched data communication network;

wherein when the given demand is a demand that is rejected during a set-up stage of the circuit-switched data communication network, the identified EOS communication channel is a newly provisioned EOS communication channel for routing the rejected demand or an existing provisioned EOS communication channel that is enlarged for routing the rejected demand.

2. The method of claim 1, wherein the given demand for which the route is to be determined is a demand previously rejected by the circuit-switched data communication network.

3. The method of claim 1, wherein the given demand for which the route is to be determined is a demand already routed in the circuit-switched data communication network.

4. The method of claim 1, wherein the given demand for which the route is to be determined is a demand anticipated to be routed in the circuit-switched data communication network.

5. The method of claim 1, wherein the step of obtaining the given demand further comprises obtaining at least one of a committed information rate and a peak information rate associated with the given demand.

6. The method of claim 1, wherein the step of specifying the EOS communication channel further comprises computing a bandwidth efficiency metric.

7. The method of claim 6, wherein the step of computing the bandwidth efficiency metric is based on a size of the EOS communication channel being considered and a measure of the statistically multiplexed bandwidth of demands that the EOS communication channel being considered will accommodate.

8. The method of claim 1, further comprising the step of identifying via the computing system one or more bottleneck nodes in the circuit-switched data communication network.

9. The method of claim 8, further comprising the step of causing via the computing system bypassing of one or more of the identified bottleneck nodes.

10. The method of claim 9, wherein bypassing one or more of the identified bottleneck nodes comprises rerouting one or more existing demands in the circuit-switched data communication network.

11. The method of claim 1, wherein the identified EOS communication channel is selected to bypass one or more bottlenecks in the circuit-switched data communication network.

12. The method of claim 1, wherein the identified EOS communication channel is selected such that no preexisting demand is rerouted in the circuit-switched data communication network.

13. The method of claim 1, wherein the identified EOS communication channel is selected such that one or more preexisting demands are rerouted in the circuit-switched data communication network.

14. Apparatus for determining a route for a demand in a circuit-switched data communication network, comprising: a memory; and at least one processor coupled to the memory and operative to: (i) obtain the given demand to be routed in the circuit-switched data communication network, wherein the circuit-switched data communication network implements a packet ring (PR) model such that one or more demands are routable on one or more virtual data rings in the circuit-switched data communication network; (ii) specify an Ethernet-Over-SONET (EOS) communication channel in the circuit-switched data communication network suitable for accommodating the given demand; and (iii) identify one of the EOS communication channel and one of the one or more virtual data rings as a route for the given demand such that the circuit-switched data communication network operates in a hybrid architecture wherein one or more EOS communication channels are selectively used in conjunction with the one or more virtual data rings specified in accordance with the PR model to route demands in the circuit-switched data communication network;

wherein when the given demand is a demand that is rejected during a set-up stage of the circuit-switched data communication network, the identified EOS communication channel is a newly provisioned EOS communication channel for routing the rejected demand or an existing provisioned EOS communication channel that is enlarged for routing the rejected demand.

15. The apparatus of claim 14, wherein the given demand for which the route is to be determined is a demand previously rejected by the circuit-switched data communication network.

16. The apparatus of claim 14, wherein the given demand for which the route is to be determined is a demand already routed in the circuit-switched data communication network.

17. The apparatus of claim 14, wherein the given demand for which the route is to be determined is a demand anticipated to be routed in the circuit-switched data communication network.

18. The apparatus of claim 14, wherein the operation of obtaining the given demand further comprises obtaining at least one of a committed information rate and a peak information rate associated with the demand.

19. The apparatus of claim 14, wherein the operation of specifying the EOS communication channel further comprises computing a bandwidth efficiency metric.

20. The apparatus of claim 19, wherein the operation of computing the bandwidth efficiency metric is based on a size of the EOS communication channel being considered and a measure of the statistically multiplexed bandwidth of demands that the EOS communication channel being considered will accommodate.

21. The apparatus of claim 14, wherein the at least one processor is further operative to identify one or more bottleneck nodes in the circuit-switched data communication network.

22. The apparatus of claim 21, wherein the at least one processor is further operative to cause bypass of one or more of the identified bottleneck nodes by rerouting one or more existing demands in the circuit-switched data communication network.

23. An article of manufacture comprising a machine-readable tangible storage medium storing one or more programs for use in determining a route for a demand in a circuit-switched data communication network, the one or more programs when executed in a processor implementing a method comprising the steps of:

obtaining the given demand to be routed in the circuit-switched data communication network, wherein the circuit-switched data communication network implements a packet ring (PR) model such that one or more demands are routable on one or more virtual data rings in the circuit-switched data communication network;

specifying an Ethernet-Over-SONET (EOS) communication channel in the circuit-switched data communication network suitable for accommodating the given demand; and identifying one of the EOS communication channel and one of the one or more virtual data rings as a route for the given demand such that the circuit-switched data communication network operates in a hybrid architecture wherein one or more EOS communication channels are selectively used in conjunction with the one or more virtual data rings specified in accordance with the PR model to route demands in the circuit-switched data communication network;

wherein when the given demand is a demand that is rejected during a set-up stage of the circuit-switched data communication network, the identified EOS communication channel is a newly provisioned EOS communication channel for routing the rejected demand or an existing provisioned EOS communication channel that is enlarged for routing the rejected demand.

* * * * *